US012621854B2

(12) United States Patent
Mu

(10) Patent No.: US 12,621,854 B2
(45) Date of Patent: May 5, 2026

(54) INFORMATION TRANSMISSION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 278 days.

(21) Appl. No.: 18/558,501

(22) PCT Filed: May 10, 2021

(86) PCT No.: PCT/CN2021/092687
§ 371 (c)(1),
(2) Date: Nov. 1, 2023

(87) PCT Pub. No.: WO2022/236547
PCT Pub. Date: Nov. 17, 2022

(65) Prior Publication Data
US 2024/0365355 A1 Oct. 31, 2024

(51) Int. Cl.
*H04W 72/51* (2023.01)
*H04W 48/08* (2009.01)
*H04W 72/04* (2023.01)

(52) U.S. Cl.
CPC .......... *H04W 72/51* (2023.01); *H04W 48/08* (2013.01); *H04W 72/04* (2013.01)

(58) Field of Classification Search
CPC ...... H04W 72/51; H04W 48/08; H04W 72/04
See application file for complete search history.

(56) References Cited

U.S. PATENT DOCUMENTS

2015/0365945 A1* 12/2015 Morioka ........... H04W 72/0453
370/329
2022/0287102 A1* 9/2022 Futaki ............... H04W 74/0833

FOREIGN PATENT DOCUMENTS

JP        2013239782 A     11/2013

OTHER PUBLICATIONS

Spreadtrum Communications, "Discussion on UE complexity reduction features", 3GPP TSG RAN WG1 #104-e, R1-2100823, e-Meeting, Jan. 25-Feb. 5, 2021, 9 pages.
Samsung, "Discussion on bandwidth for RedCap UE", 3GPP TSG RAN WG1 #104b-e, R1-2103246, e-Meeting, Apr. 12-20, 2021, 8 pages.
Extended European Search Report issued in Application No. 21941123.8 dated Jun. 17, 2024, 10 pages.
Notice of Reasons for Refusal issued by the Japanese Patent Office on Feb. 3, 2025, in corresponding Application No. JP 2023-568612, 11 pages.

(Continued)

*Primary Examiner* — Brenda H Pham
(74) *Attorney, Agent, or Firm* — Finnegan, Henderson, Farabow, Garrett & Dunner, L.L.P.

(57) ABSTRACT

An information transmission method is performed by a base station, and includes: obtaining a status of an initial bandwidth part (BWP) of a reduced capability (Redcap) user equipment (UE); and sending at least one of a first system information block (SIB) or a second SIB according to the status of the initial BWP, wherein the first SIB is an SIB that is able to be read by a current general-purpose UE, and the second SIB is an SIB exclusive to the Redcap UE.

15 Claims, 3 Drawing Sheets

--- obtaining a status of an initial BWP of a Redcap UE — 101 sending a first SIB or a second SIB according to the status of the initial BWP, in which the first SIB is an SIB that is able to be read by a current general-purpose UE, and the second SIB is an SIB exclusive to the Redcap UE — 102

(56) References Cited

OTHER PUBLICATIONS

"FL summary#1 for UE complexity reduction for RedCap", Moderator (Ericsson), 3GPP TSG-RAN WG1 Meeting #104-e, R1-2101849, Jan. 25-Feb. 5, 2021, 6 pages.

LG Electronics, "Aspects related to the reduced maximum UE bandwidth of RedCap", 3GPP TSG RAN WG1 Meeting #104b-e, R1-2103352, e-Meeting, Apr. 12-20, 2021, 9 pages.

Notice of the first review opinion, for Chinese Application No. 202180001463.8, issued on May 31, 2022, 18 pages.

"BW Reduction for RedCap UE", Qualcomm Incorporated, 3GPP TSG-RAN WG1# Meeting #104b, R1-2103174, e-Meeting, Apr. 12-20, 2021, 14 pages.

Office Action issued by the Intellectual Property Office of Singapore on Nov. 14, 2025, in corresponding SG Application No. 11202308498Y, 11 pages.

\* cited by examiner

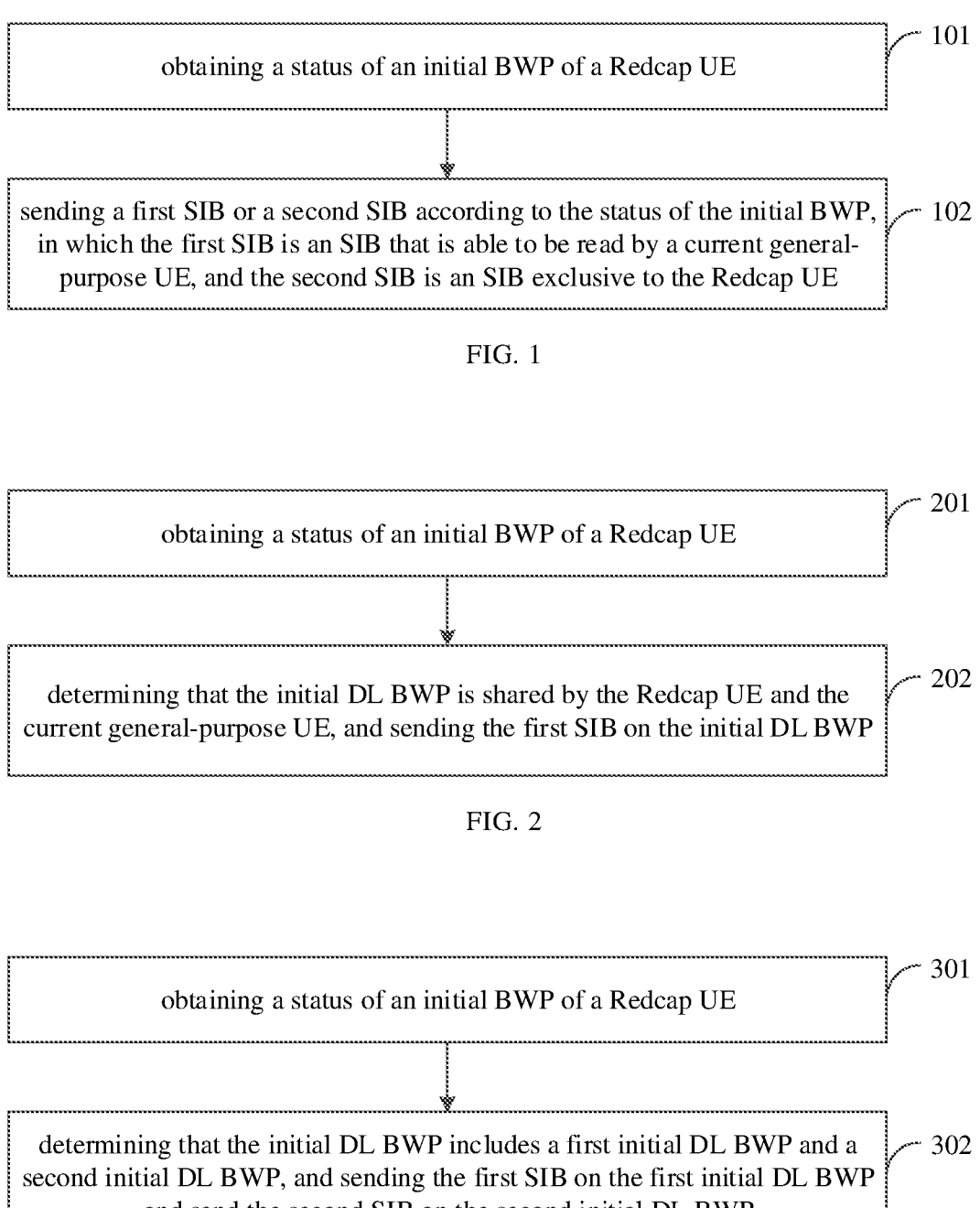

obtaining a status of an initial BWP of a Redcap UE — 101 sending a first SIB or a second SIB according to the status of the initial BWP, in which the first SIB is an SIB that is able to be read by a current general-purpose UE, and the second SIB is an SIB exclusive to the Redcap UE — 102

FIG. 1 obtaining a status of an initial BWP of a Redcap UE — 201 determining that the initial DL BWP is shared by the Redcap UE and the current general-purpose UE, and sending the first SIB on the initial DL BWP — 202

FIG. 2 obtaining a status of an initial BWP of a Redcap UE — 301 determining that the initial DL BWP includes a first initial DL BWP and a second initial DL BWP, and sending the first SIB on the first initial DL BWP and send the second SIB on the second initial DL BWP — 302

FIG. 3 obtaining a status of an initial BWP of a Redcap UE ⌐ 401 determining that the initial DL BWP includes a first initial DL BWP and a
second initial DL BWP, and sending the first SIB and/or the second SIB
according to the status of the initial UL BWP ⌐ 402 information transmission apparatus

⌐ 51 obtaining
module

⌐ 52 first processing
module

INFORMATION TRANSMISSION METHOD AND APPARATUS, COMMUNICATION DEVICE, AND STORAGE MEDIUM

CROSS REFERENCE TO RELATED APPLICATIONS

This application a U.S. national phase of International Application No. PCT/CN2021/092687, filed on May 10, 2021, the entire contents of which are incorporated herein by reference.

TECHNICAL FIELD

The disclosure relates to a field of wireless communication technologies, in particular to an information transmission method, an information transmission apparatus, a communication device and a storage medium.

BACKGROUND

In a wireless communication LTE 4G system, in order to support Internet of Things (IoT) services, a machine type communication (MTC) technology and a narrow band Internet of Things (NB-IoT) technology are proposed. These two technologies are mainly for low-rate and high-latency scenarios. With the continuous development of IoT services, such as population of services such as video monitoring, smart home, wearable devices and industrial sensing monitoring, these services usually require a transmission rate ranging from tens of Mbps to 100 Mbps, and the above services also have relatively high requirements for latency, thus the MTC technology and the NB-IoT technology in the LTE can hardly satisfy the requirements of the above services. Based on this case, designing a new user equipment (UE) in the 5G new radio (NR) is proposed by many companies to cover the requirements of such IoT devices. In the current 3rd Generation Partnership Project (3GPP) standardization, this new UE is called a reduced capability (Redcap) UE or simply referred to a NR-lite.

SUMMARY

According to a first aspect of the disclosure, an information transmission method, performed by a base station, is provided. The method includes:
    obtaining a status of an initial bandwidth part (BWP) of a Redcap UE; and
    sending at least one of a first system information block (SIB) or a second SIB according to the status of the initial BWP, in which the first SIB is an SIB that is able to be read by a current general-purpose UE, and the second SIB is an SIB exclusive to the Redcap UE.

According to a second aspect of the disclosure, a communication device is provided. The communication device includes a transceiver, a memory, and a processor connected to the transceiver and the memory, respectively. The processor is configured to perform the method according to the first aspect of the disclosure.

According to a third aspect of the disclosure, a non-transitory computer-readable storage medium having computer executable instructions stored thereon is provided. When the computer executable instructions are executed by a processor, the processor is caused to perform the method according to the first aspect of the disclosure.

BRIEF DESCRIPTION OF THE DRA WINGS

Example embodiments will be described in detail below with reference to the accompanying drawings, in which:

FIG. 1 is a flowchart of an information transmission method provided by an embodiment of the disclosure.

FIG. 2 is a flowchart of an information transmission method provided by an embodiment of the disclosure.

FIG. 3 is a flowchart of an information transmission method provided by an embodiment of the disclosure.

DETAILED DESCRIPTION

Figure 4:
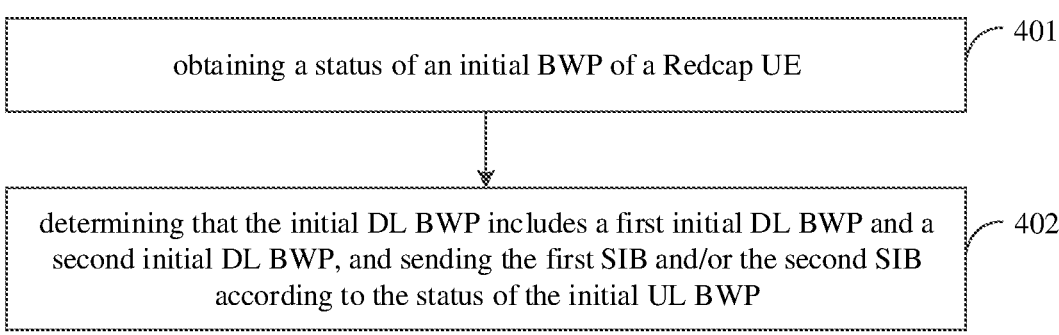
FIG. 4 is a flowchart of an information transmission method provided by an embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects of embodiments of the disclosure and as recited in the appended claims.

The terms used in the disclosure are only for the purpose of describing specific embodiments, and are not intended to limit the embodiments of the disclosure. The singular forms of "a" and "the" used in the embodiments of the disclosure and the appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Embodiments of the disclosure are described in detail below, examples of which are illustrated in the accompanying drawings, in which the same or similar reference numerals refer to the same or similar elements throughout. The embodiments described below with reference to the accompanying drawings are exemplary and intended to explain the disclosure and are not to be construed as limiting the disclosure.

Currently, an initial bandwidth part (BWP) may be configured for the Redcap UE separately in the future, to transmit exclusive system information. However, under what circumstances the exclusive system information is transmitted to avoid unnecessary updating of system information, is a technical issue that needs to be solved urgently.

The present disclosure provides an information transmission method, an information transmission apparatus, a communication device and a storage medium for solving the problem of what strategy is used for transmitting a system information block (SIB) of a reduced capability (Redcap)

user equipment (UE), to avoid unnecessary updating of system information and to reduce power overhead.

An information transmission method, an information transmission apparatus, a communication device and a storage medium provided by the disclosure will be described in detail below with reference to the accompanying drawings.

FIG. 1 is a flowchart of an information transmission method provided by an embodiment of the disclosure. The method is applied to a base station.

As illustrated in FIG. 1, the method includes the following steps.

At step 101, a status of an initial bandwidth part (BWP) of a reduced capability (Redcap) user equipment (UE) is obtained.

In the embodiment of the disclosure, the initial BWP is a default configuration of an available bandwidth configured by a 5G base station for the Redcap UE. The status of the initial BWP includes a status of an initial downlink (DL) BWP and/or a status of an initial uplink (UL) BWP. The status of the initial DL BWP includes a shared status where the initial DL BWP is shared by the Redcap UE and the general-purpose UE or a non-shared status. The status of the initial UL BWP includes a shared status where the initial UL BWP is shared by the Redcap UE and the general-purpose UE or a non-shared status.

The status of the initial BWP of the Redcap UE is determined by a first system information block (SIB). That is, the first SIB indicates the status of the initial BWP of the Redcap UE.

At step 102, a first SIB or a second SIB is sent according to the status of the initial BWP, in which the first SIB is an SIB that is able to be read by a current general-purpose UE, and the second SIB is an SIB exclusive to the Redcap UE.

In the embodiment of the disclosure, the Redcap UE is configured with the initial BWP, and the difference of the statuses of the initial BWP indicates whether or not the Redcap UE needs to be configured with an exclusive SIB. Therefore, the base station broadcasts the first SIB or the second SIB according to the status of the initial BWP. The first SIB already exists in the system, so that unnecessary updating of system information is avoided when there is no need to broadcast the second SIB, and the power overhead of the Redcap UE is reduced.

In an implementation of the embodiment, the second SIB is remaining minimum system information (RMSI), which includes a resource configuration, a frequency and power allocated for the UE by the base station. The second SIB is information that needs to be configured for the UE to access the base station.

It is understood that, there is a certain correspondence between the status of the initial BWP and a parameter in an SIB. That is, when the status of the initial BWP corresponding to the Redcap UE varies, the SIB to be configured may be adjusted correspondingly. Therefore, whether or not the Redcap UE is configured with an exclusive SIB is determined according to the status of the initial BWP.

In the information transmission method of the embodiment of the disclosure, the status of the initial BWP of the Redcap UE is obtained, thus the first SIB that is able to be read by the current general-purpose UE or the second SIB exclusive to the Redcap UE is sent according to the status of the initial BWP. In the disclosure, whether to send the first SIB that is able to be read by the current general-purpose UE or the second SIB exclusive to the Redcap UE is determined based on the status of the initial BWP of the Redcap UE.

Since the first SIB already exists in the system, unnecessary updating of system information is avoided and the power overhead is reduced.

In the above embodiments, it is described that the first SIB or the second SIB is sent according to the status of the initial BWP. The status of the initial BWP includes a plurality of possible implementations. Based on the above embodiments, description is made to the SIB configured for the Redcap UE with respect to different statuses of the initial BWP of the Redcap UE.

Based on the above embodiments, the embodiment provides another implementation. The status of the initial BWP includes the status of the initial DL BWP, i.e., a state where he general-purpose UE and the Redcap UE share the initial DL BWP.

FIG. 2 is a flowchart of an information transmission method provided by an embodiment of the disclosure. As illustrated in FIG. 2, the method includes the following steps.

At step 201, a status of an initial BWP of a Redcap UE is obtained.

The status of the initial BWP includes a status of an initial DL BWP.

In detail, reference may be made to the descriptions in the foregoing embodiments, which is not repeated in this embodiment.

At step 202, in response to the initial DL BWP being shared by the Redcap UE and a current general-purpose UE, a first SIB is sent on the initial DL BWP.

In the embodiment of the disclosure, when the Redcap UE is configured with the initial DL BWP, it determines whether the initial DL BWP is shared by the Redcap UE and the current general-purpose UE. If it determines that the initial DL BWP is shared by the Redcap UE and the current general-purpose UE, it means that the Redcap UE and the current general-purpose UE share the same initial DL BWP, that is, an SIB required by the Redcap UE is the same as the first SIB configured for the current general-purpose UE, and thus there is no need to configure another second SIB exclusive to the Redcap UE. Therefore, the base station broadcasts the first SIB on the initial DL BWP, so that the Redcap UE can receive the first SIB without the need to configure a second SIB exclusive to the Redcap UE, thus avoiding unnecessary updating of system information and reducing the power overhead.

Based on the above embodiments, the embodiment provides another implementation. The status of the initial BWP includes the status of the initial DL BWP. The initial DL BWP of the general-purpose UE and the initial DL BWP of the Redcap UE are independent of each other and are not shared, and thus an exclusive SIB is configured for the Redcap UE.

FIG. 3 is a flowchart of an information transmission method provided by an embodiment of the disclosure. As illustrated in FIG. 3, the method includes the following steps.

At step 301, a status of an initial BWP of a Redcap UE is obtained.

The status of the initial BWP includes a status of an initial DL BWP.

In detail, reference may be made to the descriptions in the foregoing embodiments, which is not repeated in this embodiment.

At step 302, it is determined that the initial DL BWP includes a first initial DL BWP and a second initial DL BWP, and the first SIB is sent on the first initial DL BWP and the second SIB is sent on the second initial DL BWP.

The first initial DL BWP is an initial DL BWP that is able to be monitored by the general-purpose UE, and the second initial DL BWP is an initial DL BWP that is able to be monitored by the Redcap UE. That is, the initial DL BWP of the general-purpose UE and the initial DL BWP of the first Redcap UE are independent of each other and are not shared.

In the embodiment, the initial DL BWPs of the general-purpose UE and the Redcap UE are independent of each other, thus an exclusive SIB configured by the base station for the Redcap UE is different from an SIB configured for the general-purpose UE. Therefore, the exclusive second SIB may be configured for the Redcap UE. Therefore, the first SIB is sent on the first initial DL BWP and the exclusive SIB (i.e., the second SIB) configured for the Redcap UE is sent on the second initial DL BWP exclusive to the Redcap UE, so that the Redcap UE may determine a time-frequency resource occupied by a transmission control signaling according to a time-frequency resource location occupied by a Physical Downlink Control Channel (PDCCH) carried in the second SIB when receiving the second SIB.

In the information transmission method of the embodiment of the disclosure, when the initial DL BWPs of the general-purpose UE and the Redcap UE are independent of each other and are not shared, the second SIB is sent using the initial DL BWP configured for the Redcap UE, so that the exclusive initial DL BWP is configured for the Redcap UE, and at the same time, the exclusive second SIB is configured for the Redcap UE.

Based on the above embodiments, the embodiment provides another implementation. The status of the initial BWP in this embodiment includes the status of the initial DL BWP and the status of the initial UL BWP. The initial DL BWP of the general-purpose UE and the initial DL BWP of the Redcap UE are independent of each other and are not shared, thus whether to configure an exclusive SIB for the Redcap UE may be determined according to the status of the initial UL BWP.

FIG. 4 is a flowchart of an information transmission method provided by an embodiment of the disclosure. As illustrated in FIG. 4, the method includes the following steps.

At step 401, a status of an initial BWP of a Redcap UE is obtained.

The status of the initial BWP includes a status of an initial DL BWP and a status of an initial UL BWP.

In detail, reference may be made to the descriptions in the foregoing embodiments, the principles are similar and are not repeated in this embodiment.

At step 402, it is determined that the initial DL BWP includes a first initial DL BWP and a second initial DL BWP, and the first SIB and/or the second SIB is sent according to the status of the initial UL BWP.

The first initial DL BWP is an initial DL BWP that is able to be monitored by the general-purpose UE, and the second initial DL BWP is an initial DL BWP that is able to be monitored by the Redcap UE.

In the embodiment, when the status of the initial BWP of the Redcap UE includes the status of the initial DL BWP and the status of the initial UL BWP, if it is determined that the status of the initial DL BWP is a non-shared state, it may be further determined whether the status of the initial UL BWP is a shared state or a non-shared state, so as to determine whether or not to configure an exclusive second SIB for the Redcap UE.

In a first implementation, the status of the initial UL BWP is the non-shared state, which means that the initial UL BWP includes a first initial UL BWP and a second initial UL BWP.

The first initial UL BWP is an initial UL BWP that is able to be monitored by the general-purpose UE, and the second initial UL BWP is an initial UL BWP that is able to be monitored by the Redcap UE. It is the base station that sends information to the UE, thus, the first SIB is sent on the first initial DL BWP, and the second SIB is sent on the second initial DL BWP, so that the Redcap UE can monitor the second SIB on the second initial UL BWP, realizing that an exclusive SIB is configured for the Redcap UE, to enable the Redcap UE to determine a time-frequency resource occupied by a transmission control signaling according to a time-frequency resource location occupied by a PDCCH carried in the second SIB.

In a second implementation, the status of the initial UL BWP is the shared state. That is, the status of the initial DL BWP is the non-shared state, and the status of the initial UL BWP is a shared status. Thus, only the first SIB is sent on the first initial DL BWP. That is, the Redcap UE may use the same SIB as the general-purpose UE, thereby avoiding unnecessary updating of system information and reducing power overhead.

In a third implementation, the status of the initial UL BWP is the shared state. That is, the status of the initial DL BWP is the non-shared state, and the status of the initial UL BWP is the shared status. Thus, the first SIB is sent on the first initial DL BWP, and the second SIB is sent on the second initial DL BWP, which realizes configuring the exclusive SIB for the Redcap UE, and improves the accuracy.

In order to realize the above embodiments, the embodiments of the disclosure provide an information transmission apparatus.

Figure 5:
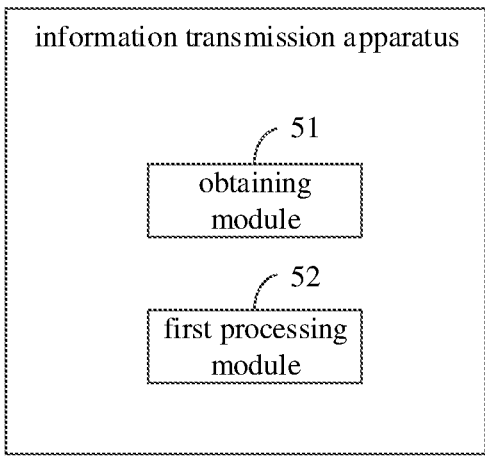
FIG. 5 is a block diagram of an information transmission apparatus provided by an embodiment of the disclosure.

FIG. 5 is a block diagram of an information transmission apparatus provided by an embodiment of the disclosure. As illustrated in FIG. 5, the apparatus includes:

an obtaining module 51, configured to obtain a status of an initial BWP of a Redcap UE; and a first processing module 52, configured to send a first SIB or a second SIB according to the status of the initial BWP, in which the first SIB is an SIB that is able to be read by a current general-purpose UE, and the second SIB is an SIB exclusive to the Redcap UE.

In an implementation of the embodiment of the disclosure, the status of the initial BWP includes a status of an initial DL BWP, and the first processing module 52 is configured to:

in response to the initial DL BWP being shared by the Redcap UE and the current general-purpose UE, send the first SIB on the initial DL BWP.

In an implementation of the embodiment of the disclosure, the status of the initial BWP includes a status of an initial DL BWP, and the first processing module 52 is configured to:

In response to the initial DL BWP including a first initial DL BWP and a second initial DL BWP, send the first SIB on the first initial DL BWP and send the second SIB on the second initial DL BWP, in which the first initial DL BWP is a DL BWP that is able to be monitored by the general-purpose UE, and the second initial DL BWP is a DL BWP that is able to be monitored by the Redcap UE.

In an implementation of the embodiment of the disclosure, the status of the initial BWP includes a status of an initial UL BWP, the apparatus further includes:

a second processing module, configured to, in response to the initial DL BWP including a first initial DL BWP and a second initial DL BWP, send the first SIB and/or the second SIB according to the status of the initial UL BWP, in which the first initial DL BWP is a DL BWP that is able to be monitored by the general-purpose UE, and the second initial DL BWP is a DL BWP that is able to be monitored by the Redcap UE.

In an implementation of the embodiment of the disclosure, the second processing module is configured to:

in response to the initial UL BWP including a first initial UL BWP and a second initial UL BWP, send the first SIB on the first initial DL BWP and send the second SIB on the second initial DL BWP, in which the first initial UL BWP is an UL BWP that is able to be monitored by the general-purpose UE, and the second initial UL BWP is an UL BWP that is able to be monitored by the Redcap UE; and in response to the status of the initial UL BWP being a shared status, send the first SIB on the first initial DL BWP.

In an implementation of the embodiment of the disclosure, the status of the initial BWP of the Redcap UE is determined by the first SIB.

It is noted that the explanations of the foregoing method embodiments are also applicable to the apparatus of the embodiments of the disclosure with the same principles, which are not repeated in this embodiment.

With the information transmission apparatus of the embodiment of the disclosure, the status of the initial BWP of the Redcap UE is obtained, thus, the first SIB that is able to be read by the current general-purpose UE or the second SIB exclusive to the Redcap UE is sent according to the status of the initial BWP. In the disclosure, whether to send the first SIB that is able to be read by the current general-purpose UE or the second SIB exclusive to the Redcap UE is determined based on the status of the initial BWP of the Redcap UE. Since the first SIB already exists in the system, unnecessary updating of system information is avoided and the power overhead is reduced.

In order to realize the above embodiments, the disclosure also provides a communication device.

The communication device provided by the embodiment of the disclosure includes a processor, a transceiver, and a memory having executable programs stored thereon and executable by the processor. When the executable programs are executed by the processor, the above method is implemented.

The communication device may be the base station or the UE described above.

The processor may include various types of storage mediums. The storage mediums are non-transitory computer storage mediums capable of continuing to memorize the information stored thereon after the communication device is powered down. The communication device includes a base station or a terminal.

The processor may be connected to the memory via a bus for reading the executable programs stored on the memory, e.g., as that in at least one of FIGS. 1-4.

In an implementation, the communication device may include circuits. The circuits may implement the sending, receiving or communicating function in the above method embodiments. The processor and the transceiver described in this disclosure may be implemented on an integrated circuit (IC), an analog IC, a radio frequency integrated circuit (RFIC), a mixed signal IC, an application specific integrated circuit (ASIC), a printed circuit board (PCB), and an electronic device. The processor and the transceiver can also be produced using various IC process technologies such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication device in the above description of embodiments may be a network device or a terminal device (such as the Redcap UE in the above method embodiments), but the scope of the communication device described in the disclosure is not limited thereto. The communication device may be a stand-alone device or may be part of a large device. For example the communication device may be:

(1) a stand-alone IC, a chip, a chip system or a subsystem;

(2) a collection of ICs including one or more ICs, optionally, the collection of ICs may also include a storage component for storing data and computer programs;

(3) an ASIC, such as a modem;

(4) a module that can be embedded within other devices;

(5) a receivers, a terminal device, a smart terminal device, a cellular phone, a wireless device, a handheld machine, a mobile unit, an in-vehicle device, a network device, a cloud device, an artificial intelligence device, and the like; and (6) others.

In order to realize the above embodiments, the disclosure also provides a computer storage medium.

The computer storage medium provided by the embodiment of the disclosure has executable programs stored thereon. When the executable programs are executed by a processor, the above method, such as that in at least one of FIGS. 1-4, can be implemented.

In order to realize the above embodiments, the disclosure also provides a computer program product.

The computer program product provided by the embodiment of the disclosure includes computer programs. When the computer programs are executed by a processor, the above method, such as that in at least one of FIGS. 1-4, is implemented.

Figure 6:
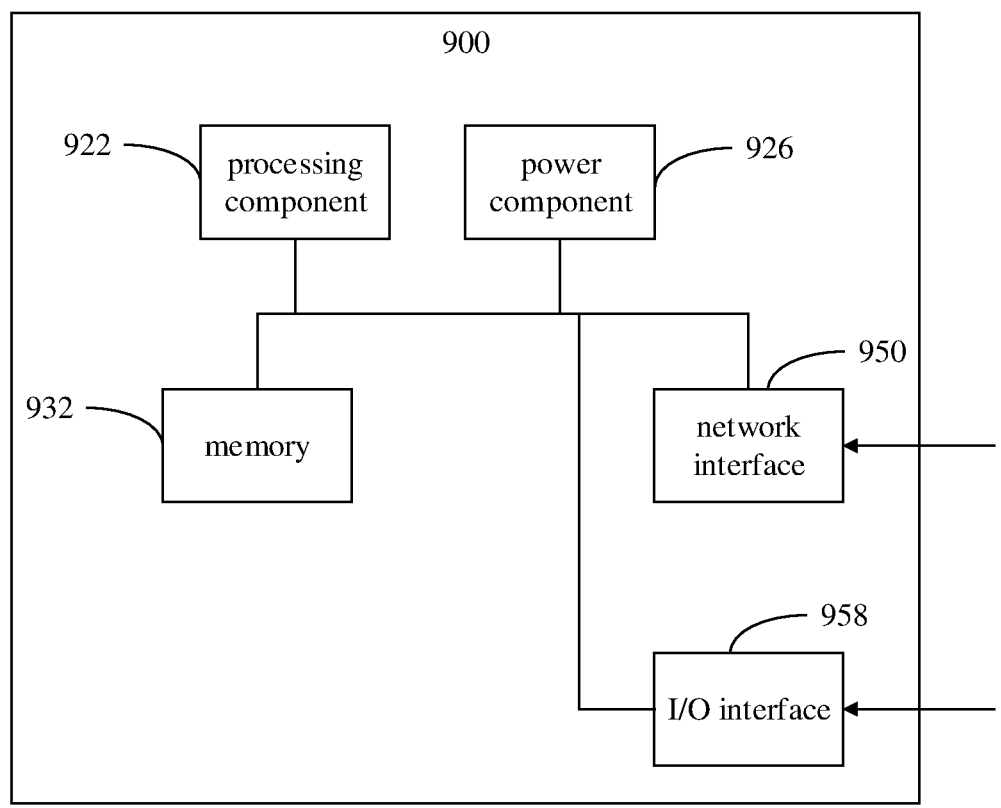
FIG. 6 is a block diagram of a base station provided by an embodiment of the disclosure.

FIG. 6 is a block diagram of a base station provided by an embodiment of the disclosure. For example, the base station 900 may be provided as a network device. As illustrated in FIG. 6, the base station 900 includes a processing component 922 including one or more processors, and memory resources represented by a memory 932 for storing instructions that can be executed by the processing component 922, such as applications. The application programs stored in the memory 932 may include one or more modules each corresponding to a set of instructions. In addition, the processing component 922 is configured to execute the instructions to perform the method applied to the base station as described above, e.g., the method in FIGS. 1-4.

The base station 900 may also include a power component 926 configured to perform power management of the base station 900, a wired or wireless network interface 950 configured to connect the base station 900 to a network, and an input/output (I/O) interface 958. The base station 900 may operate on an operating system stored in the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, usages, or adaptations of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information transmission method, performed by a base station, comprising:

obtaining a status of an initial bandwidth part (BWP) of a reduced capability (Redcap) user equipment (UE), wherein the status of the initial BWP comprises a status of an initial downlink (DL) BWP and a status of an initial uplink (UL) BWP; and sending at least one of a first system information block (SIB) or a second SIB according to the status of the initial BWP, wherein the first SIB is an SIB that is able to be read by a current general-purpose UE, and the second SIB is an SIB exclusive to the Redcap UE;

wherein sending at least one of the first SIB or the second SIB according to the status of the initial BWP comprises:

determining that the initial DL BWP comprises a first initial DL BWP and a second initial DL BWP, wherein the first initial DL BWP is an initial DL BWP that is able to be monitored by the general-purpose UE, and the second initial DL BWP is an initial DL BWP that is able to be monitored by the Redcap UE; and sending the at least one of the first SIB or the second SIB according to the status of the initial UL BWP.

2. The method of claim 1, wherein sending at least one of the first SIB or the second SIB according to the status of the initial BWP further comprises:

determining that the initial DL BWP is shared by the Redcap UE and the current general-purpose UE, and sending the first SIB on the initial DL BWP.

3. The method of claim 1, wherein sending at least one of the first SIB or the second SIB according to the status of the initial BWP further comprises:

sending the first SIB on the first initial DL BWP and sending the second SIB on the second initial DL BWP.

4. The method of claim 1, wherein sending the at least one of the first SIB or the second SIB according to the status of the initial UL BWP comprises:

determining that the initial UL BWP comprises a first initial UL BWP and a second initial UL BWP, sending the first SIB on the first initial DL BWP and sending the second SIB on the second initial DL BWP, wherein the first initial UL BWP is an initial UL BWP that is able to be monitored by the general-purpose UE, and the second initial UL BWP is an initial UL BWP that is able to be monitored by the Redcap UE; and determining that the status of the initial UL BWP is a shared status, and sending the first SIB on the first initial DL BWP.

5. The method of claim 1, wherein the status of the initial BWP of the Redcap UE is determined by the first SIB.

6. A communication device, comprising:

a transceiver;

a memory; and a processor connected to the transceiver and the memory, respectively, wherein the processor is configured to:

obtain a status of an initial bandwidth part (BWP) of a reduced capability (Redcap) user equipment (UE), wherein the status of the initial BWP comprises a status of an initial downlink (DL) BWP and a status of an initial uplink (UL) BWP; and send at least one of a first system information block (SIB) or a second SIB according to the status of the initial BWP, wherein the first SIB is an SIB that is able to be read by a current general-purpose UE, and the second SIB is an SIB exclusive to the Redcap UE;

wherein sending at least one of the first SIB or the second SIB according to the status of the initial BWP comprises:

determining the initial DL BWP comprises a first initial DL BWP and a second initial DL BWP, wherein the first initial DL BWP is an initial DL BWP that is able to be monitored by the general-purpose UE, and the second initial DL BWP is an initial DL BWP that is able to be monitored by the Redcap UE; and sending the at least one of the first SIB or the second SIB according to the status of the initial UL BWP.

7. The communication device of claim 6, wherein sending at least one of the first SIB or the second SIB according to the status of the initial BWP further comprises:

determining that the initial DL BWP is shared by the Redcap UE and the current general-purpose UE, and sending the first SIB on the initial DL BWP.

8. The communication device of claim 6, wherein sending at least one of the first SIB or the second SIB according to the status of the initial BWP further comprises:

sending the first SIB on the first initial DL BWP and sending the second SIB on the second initial DL BWP.

9. The communication device of claim 6, wherein sending the at least one of the first SIB or the second SIB according to the status of the initial UL BWP comprises:

determining that the initial UL BWP comprises a first initial UL BWP and a second initial UL BWP, sending the first SIB on the first initial DL BWP and sending the second SIB on the second initial DL BWP, wherein the first initial UL BWP is an initial UL BWP that is able to be monitored by the general-purpose UE, and the second initial UL BWP is an initial UL BWP that is able to be monitored by the Redcap UE; and determining that the status of the initial UL BWP is a shared status, and sending the first SIB on the first initial DL BWP.

10. The communication device of claim 6, wherein the status of the initial BWP of the Redcap UE is determined by the first SIB.

11. A non-transitory computer-readable storage medium having computer executable instructions stored thereon, wherein when the computer executable instructions are executed by a processor, the processor is caused to perform:

obtaining a status of an initial bandwidth part (BWP) of a reduced capability (Redcap) user equipment (UE), wherein the status of the initial BWP comprises a status of an initial downlink (DL) BWP and a status of an initial uplink (UL) BWP; and sending at least one of a first system information block (SIB) or a second SIB according to the status of the initial BWP, wherein the first SIB is an SIB that is able to be read by a current general-purpose UE, and the second SIB is an SIB exclusive to the Redcap UE;

wherein sending at least one of the first SIB or the second SIB according to the status of the initial BWP comprises:

determining the initial DL BWP comprises a first initial DL BWP and a second initial DL BWP, wherein the first initial DL BWP is an initial DL BWP that is able to be monitored by the general-purpose UE, and the second initial DL BWP is an initial DL BWP that is able to be monitored by the Redcap UE; and sending the at least one of the first SIB or the second SIB according to the status of the initial UL BWP.

12. The non-transitory computer-readable storage medium of claim 11, wherein sending at least one of the first SIB or the second SIB according to the status of the initial BWP further comprises:

determining that the initial DL BWP is shared by the Redcap UE and the current general-purpose UE, and sending the first SIB on the initial DL BWP.

13. The non-transitory computer-readable storage medium of claim 11, wherein sending at least one of the first SIB or the second SIB according to the status of the initial BWP further comprises:

sending the first SIB on the first initial DL BWP and sending the second SIB on the second initial DL BWP.

14. The non-transitory computer-readable storage medium of claim 11, wherein sending the at least one of the first SIB or the second SIB according to the status of the initial UL BWP comprises:

determining that the initial UL BWP comprises a first initial UL BWP and a second initial UL BWP, sending the first SIB on the first initial DL BWP and sending the second SIB on the second initial DL BWP, wherein the first initial UL BWP is an initial UL BWP that is able to be monitored by the general-purpose UE, and the second initial UL BWP is an initial UL BWP that is able to be monitored by the Redcap UE; and determining that the status of the initial UL BWP is a shared status, and sending the first SIB on the first initial DL BWP.

15. The non-transitory computer-readable storage medium of claim 11, wherein the status of the initial BWP of the Redcap UE is determined by the first SIB.

* * * * *